July 20, 1943. R. W. BROWN 2,324,984

PIVOTAL JOINT

Filed July 26, 1940 3 Sheets-Sheet 1

INVENTOR
Roy W. Brown

BY
Ely & Frye

ATTORNEYS

July 20, 1943. R. W. BROWN 2,324,984
PIVOTAL JOINT
Filed July 26, 1940 3 Sheets-Sheet 2
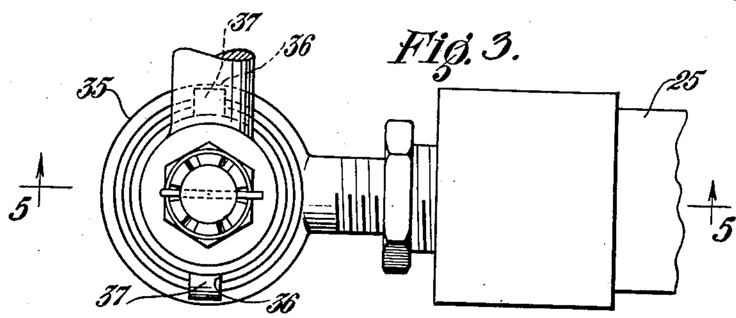
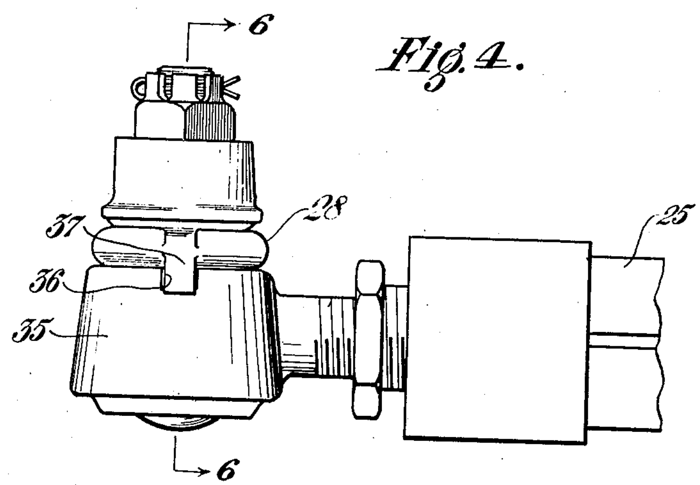
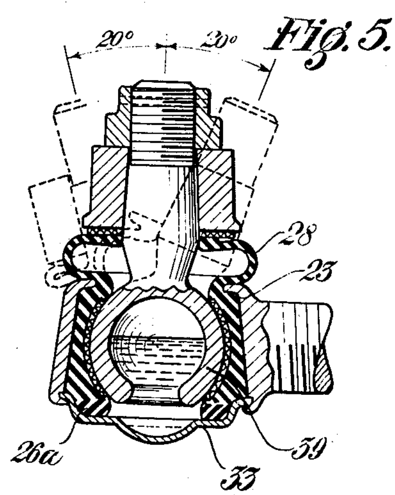
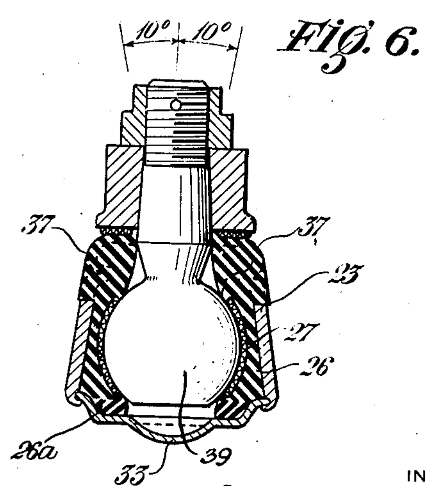
INVENTOR
Roy W. Brown
BY
Ely & Frye
ATTORNEYS July 20, 1943. R. W. BROWN 2,324,984
PIVOTAL JOINT
Filed July 26, 1940 3 Sheets-Sheet 3
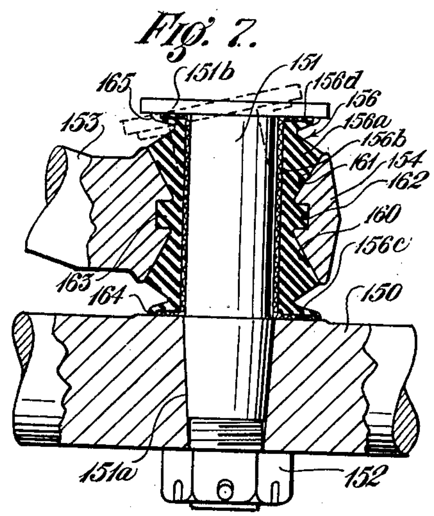
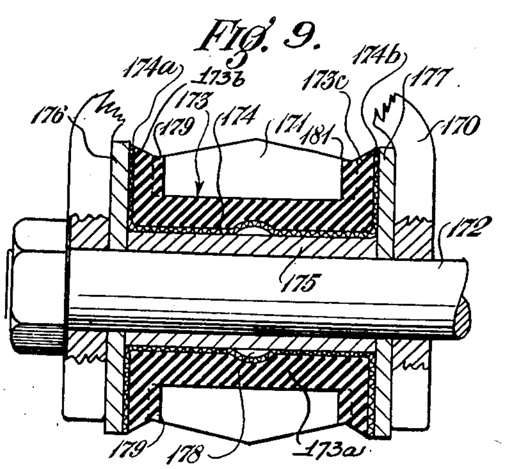
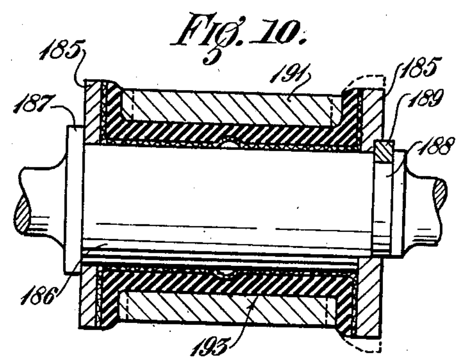
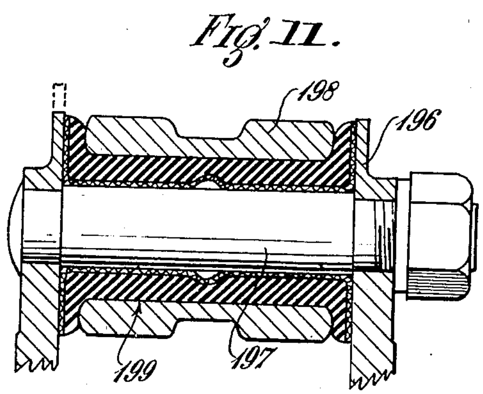
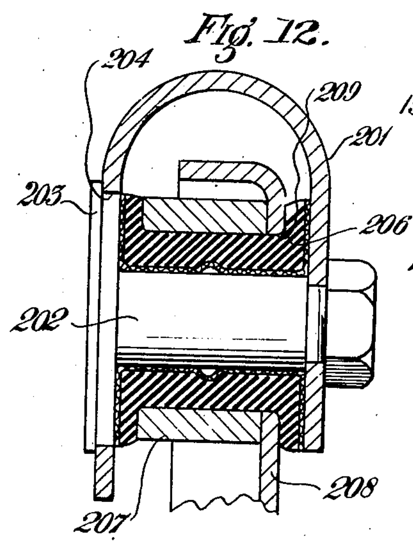
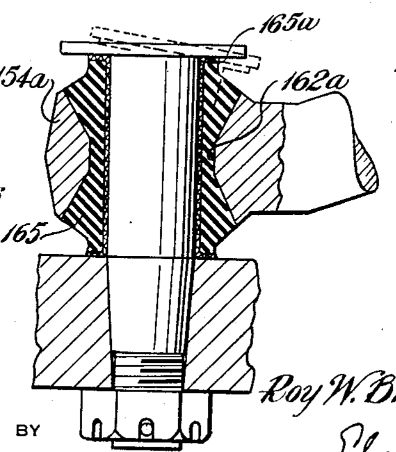
Fig. 8.
INVENTOR
Roy W. Brown
BY
Ely & Frye
ATTORNEYS

'87. ROD JOINTS &
COUPLINGS,
90

Search Room

Patented July 20, 1943

2,324,984

UNITED STATES PATENT OFFICE 2,324,984

PIVOTAL JOINT

Roy W. Brown, Akron, Ohio, assignor to The Firestone Tire & Rubber Company, Akron, Ohio, a corporation of Ohio Application July 26, 1940, Serial No. 347,724

5 Claims. (Cl. 287—90)

This invention relates to a pivotal joint. It more particularly relates to an insulating and pivotal joint having an elastic bushing provided with a permanently lubricated surface.

One of the major objects of the invention is to provide an improved pivotal joint which is inexpensive to manufacture, particularly on a mass production basis.

Another object is to provide an improved pivotal joint having a minimum of parts and which will not require adjustment during its useful life.

Another object is to provide a pivotal joint having a resiliently yielding characteristic, so that it will have insulating and a controllable amount of shock absorbing properties.

Another object is to provide a pivotal joint of the type referred to in which the resiliency or adjustability of the bushing can be readily predetermined during the manufacturing and assembly operations.

Another object is to provide a pivotal joint which will permit relative movement of the connected parts in the three planes at right angles to each other and rotational movement while at the same time providing yieldingly resilient centering means to prevent the outer shell or housing of the joint, from metal to metal contact with the shank of the ball and will thereby preclude excessive wear and noise.

Another object is to provide a device of the type referred to above which will be substantially tight against dirt, water, and the like encountered in normal use.

Another object is to provide an improved pivotal joint having a dynamic coefficient of friction greater than the static coefficient—that is, one in which less force is necessary to initiate movement of the joint than is necessary to maintain movement.

Other objects will be readily apparent from the following description when considered with the accompanying drawings in which:

Figure 3 is an enlarged partial plan view of Figure 1 showing an alternative construction wherein the outer housing for the pivotal joint is attached to the steering cross link;

Figure 4 is a side elevation of Figure 3;

Figure 5 is a front sectional view on the line 5—5 of Figure 3, showing possible pivotal movement;

Figure 6 is a sectional view of Figure 4 on the line 6—6 and looking in the direction of the arrows;

Figures 7 and 8 are vertical sections of modified forms of the invention which may be used in place of previously described joints, such as that shown in Figure 2, in the typical steering linkage shown in Figure 1; and Figures 9 to 12 show sections of further modified forms of the invention which are particularly adapted to spring shackles, torque arms, steering linkages, and the like.

Broadly speaking, the present invention contemplates a pivotal connection which is capable of relative movement about the three planes at right angles to each other and rotational movement about an axis in one or more of the planes. All of the joints disclosed permit universal pivotal movement, but some are constructed and arranged to permit more relative movement in some plane, or planes, than in other planes. Furthermore, the invention contemplates such a joint in which the two parts of the joint are resiliently urged to an intermediate relative position in order to prevent rattling and excessive wear.

The joint is particularly adapted for use in the steering linkages of vehicle wheels although it is readily applicable to any type of mechanical linkage such as, for instance, those used in connection with shock absorbers, spring shackles, transmission shifting mechanisms and the like.

Figure 1:
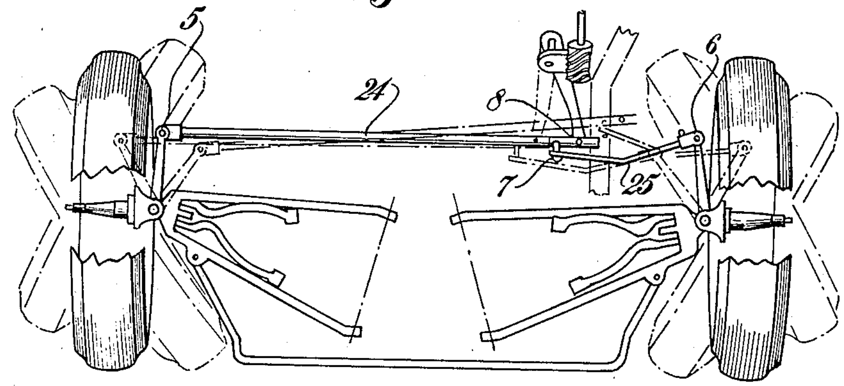
Figure 1 illustrates the environment of the application of an embodiment of the invention as applied to a typical steering linkage of typical independently suspended front wheels of an automotive vehicle.
Figure 2:
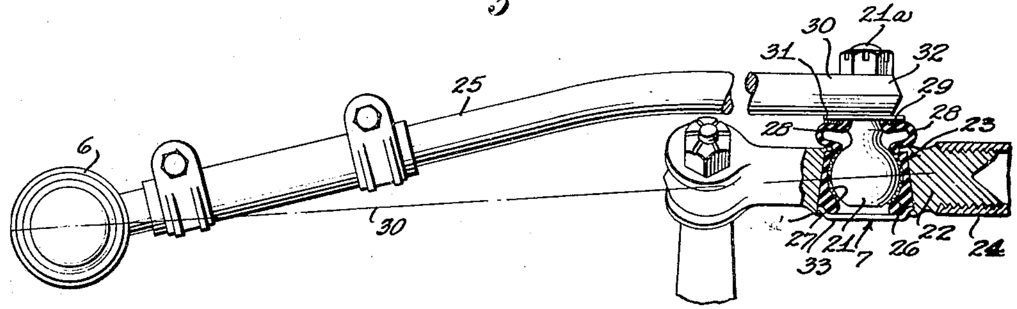
Figure 2 is a partial section detail of the short linkage shown in Figure 1.

Some embodiments of the present invention are illustrated as applied to the steering gear linkages of independently suspended steering wheels in an automobile, typical illustrative examples of this application being shown in Figures 1 and 2.

Other embodiments are shown as applied to solid axle steering linkages, to spring shackles, torque arms, and the like. It will be readily understood that the relative movement between a steerable wheel and the body or frame of a vehicle is of a very complex nature. The wheels must be capable of pivotal movement about a substantially vertical axis and, at the same time, must be capable of relative vertical movement with the body, or frame, and must be adapted to move angularly, in general, with respect to the wheels of the vehicle about axes transverse, as well as longitudinal, of the vehicle. Any combination of these relative movements may take place simultaneously. It will be readily understood that since the steering mechanism of a vehicle is rigidly attached to the frame, it is necessary that universal pivotal connections to the steerable wheels be provided to permit control of the wheels under any or all of the above conditions. These pivotal joints must permit the necessary movement and at the same time must be stabilized to prevent rattling and excessive wear.

From a practical standpoint the center of mass of the steering linkages is very seldom, if ever, on the theoretical axis passing through the center of the pivotal joints and it will therefore be seen that when the wheels of the vehicle are subjected to very high accelerations in vertical directions, such as when the wheel passes over irregularities of the road at high speed that a "whipping action," that is, an oscillatory rotational movement about a line passing through the center of the pivotal connections of the linkage will take place. This is particularly true of steering linkages, such as that shown in Figure 1, where for manufacturing reasons it is necessary that the links be bent, which still further displaces the center of mass from the axis passing through the center of the joints. The "whipping action" of these links is particularly severe about their end connections. In devices heretofore, this "whipping action" has caused excessive hammering and wear of the neck of the ball pivot as it strikes the outer casing of the joint, with the result that the pivotal connection soon became very noisy and had to be replaced. The further disadvantages of previous constructions is that it is very difficult to provide a satisfactory dirt and water seal about the neck of the ball and, at the same time, permit the full necessary range of angular movement in the necessary directions and positions.

Referring specifically to the drawings, an embodiment of the invention is illustrated as applied at the points 5 to 8, of typical steering linkages of a vehicle, as shown in Figure 1. The various dotted positions of the wheels and steering linkages of Figure 1 illustrate the type of relative pivotal movement to which the joints must be adapted in order to operate satisfactorily in the applications shown. It is, of course, understood that the pivotal joint may also be adapted to applications where the range of relative movement is more or less greater than that shown, by a mere mechanical change to adapt it to the particular installation desired.

In general, the pivotal joint 7 is typical of an embodiment of the invention and comprises an inner bearing member 21, illustrated as a ball, an outer housing 22, and an intermediate bushing 23, shown in Figure 2, and subsequent figures. The ball member 21 may take various forms so long as it has a substantially spherical bearing surface, and the outer casing 22 may also take various forms, the particular alternative constructions being discussed in detail hereinafter. The gear member 21 has an integral stud 21a which may be attached to one of the pivoted parts. The bushing 23 comprises a resilient outer layer of rubber 26, or material having substantially similar properties, and an inner flexible lining 27.

In Figure 2 the outer housing 22 is shown as formed as an integral part of the steering cross link 24, also illustrated in Figure 1. The lining 27 is preferably made of porous material capable of being impregnated with lubricant sufficient in amount and having such characteristics that the joint will be properly lubricated for the full useful life of the joint. The flexibility of the lining 27 and the resiliency of the rubber layer 26 gives the joint noise and vibration insulating properties and allows slight irregularities on the inner bearing member 21. This eliminates the necessity of machining operations on this part. The inner bearing member can, therefore, be made of an unmachined metal stamped or forged part. In this particular instance the layer 26 is preferably made of oil-resistant rubber and the lubricated layer 27 is formed of a special fabric composition which has been impregnated with a suitable lubricant, details of which will be hereinafter set forth. The outer layer 26 has an integral extension, or skirt 28 extending beyond the housing 22 and surrounding the shank of the stud on the inner bearing member. The skirt 28 terminates in a flange 29 carrying a lubricated disk of lining material 31, which is a composition similar to the lining 27 of the ball joint. This skirt and flange lining material are resiliently urged against the under surface of an eye 32 on the end of steering link 25 and thereby provide a suitable dirt seal to exclude water, dirt or foreign matter from the ball joint.

The bushing 23 is molded and vulcanized to a predetermined form, size, and shape substantially complemental to the inner contour of the housing 22 in the link 24 and the ball joint and bushing are inserted through the aperture in the lower side of the housing and thereafter the plate-like disk 33 is placed thereover to close same and a flange 34 is peened over to retain the disk 33 in fixed position.

The lining 27 is preferably fabric, which has been impregnated with a lubricant comprising a solid and a liquid, to produce, when in frictional contact with the metal ball, a dynamic coefficient of friction greater than its static coefficient. This is very important and desirable in steering linkages, because such characteristic greatly facilitates a driver in maintaining a desired course at high speeds despite intermittent external side forces due to wind and shifting of the vehicle due to uneven road conditions. With steering linkages having this peculiar friction characteristic there is substantially no extra "breakaway" effort required to initiate steering control—there is less effort required to initiate steering movement than is necessary to maintain steering movement. This permits an operator to apply a steady, smooth force while changing the steering angle of the dirigible wheels which is very necessary to maintain a predetermined course at high speed wtihout fatigue to the driver.

For the purpose of providing a stable and rattle-free joint, means may be provided to urge the shank of the stud 21a to a central position relative to the outer housing. Joint 6 is exactly similar to joint 7 in this respect, the details of which are shown in Figures 3 to 6. The only difference between joints 6 and 7 is that the latter has its housing arranged between the ends of the drag link 24, while in the former, the housing is at one end of the drag link 25. To this end, the outer housing 35 of the joint 6 is provided with recesses 36 at diametrically opposed sides of the housing and the recesses are engaged by lugs 37 which are integral with the extension or skirt 28 on the resilient bushing 23 of the joint. The bushing of joint 7 is exactly similar to the bushing of joint 6 and therefore the same reference numerals are used. The engagement of the lugs with the recesses prevents relative rotational movement between the hous- COUPLINGS,
90
Search Room ing and the bushing and therefore prevents chafing of the rubber layer.

The lugs 37 are arranged at substantially right angles to the pivotal axis 30 of the link 25, which passes through the centers of the ball joints 6 and 7 to resist "whipping action" or the oscillatory movements of the link 25, due to inertia of the link 25 when the wheel of the vehicle and the outer end of the link 25 are subjected to vertical oscillations.

As set forth above, functionally and structurally, joints 6 and 7 are substantially identical and further common features will be set forth with reference to Figures 5 and 6 wherein the lower end of rubber layer 26 is provided with an annular ring portion 26a of rubber stock softer, when vulcanized, than that of the layer itself. The line of demarcation between these two stocks is indicated by the cross-hatching.

During the manufacture of the rubber part the thickness and resiliency of this ring may be altered so that when disk-like plate 33 is fixed in predetermined assembled relation the bushing 23 will be placed under a predetermined amount of compression for the purpose of providing a snug fit between the lining 27 and the ball 39. It is to be understood in this connection, however, that the rubber part 26 is molded to a shape substantially complemental to the inside contour of the housing before assembling, and that the amount of compression of the assembled joint is only sufficient to maintain a stable joint. The relative position of the ball with respect to the casing is determined by the shaping of the molded rubber part and not primarily by the amount of compression to which the lining is subjected.

As shown, the pivotal connection is capable of moving farther in the plane illustrated in Figure 5 than in the plan at right angles thereto, illustrated in Figure 6. The necessity for this movement in one plane and the limitation in the other plane will be readily understood by reference to the previous general view of Figure 1. It will be noted that in order to accommodate all of the steering movements for the various possible positions of the wheels with relation to the body, greater angular movement will be necessary in some planes than in other planes.

As particularly shown in Figure 5, a hollow ball 39 may be substituted for the solid ball 21 of Figure 8, if desired, and the hollow space may be filled with a reserve supply of lubricant composition during the assembly of the universal joint.

Figure 7 shows a further modified form of the invention which may be applied to the steering mechanism of a vehicle and has the same general application as that shown in Figure 2. In the embodiment shown a drag link 150 is provided for connecting the two dirigible spindles (not shown) of a vehicle. A headed bolt 151, having a tapered shank 151a fits into a complementally tapered bore in the drag link 150 and is held in place in suitable manner, as by means of the nut 152.

A steering link 153 has an eye 154, which encompasses a resilient bushing 156 of the same general construction previously described in that it comprises a rubber outer sleeve 156a and a lining of permanently lubricated material 156b. The lining 156b is in the form of a sleeve which engages the outer surface of the bolt 151 and flanges 156c and 156d which engage, respectively, the drag link 150 and the head 151b of the bolt 151.

The inside of the eye 154 is provided with two conical bores 160 and 161 with their small ends in confronting relation. The bushing 156 has complemental surfaces engaging the inner surface of the eye 154. For the purpose of preventing relative axial displacement between the bushing 156 and the eye 154 an annular recess 162 is provided, into which an annular central flange 163 on the bushing 156 engages. Since the bolt 151 is cylindrical, the conical surfaces 160 and 161 of the eye 154 permits a large range of relative oscillatory movement between the bolt 151 and the eye 154 in the plane of the axis of the bolt, as well as permitting relative pivotal movement about axes passing through the axis of the bolt, by way of distortion of the rubber bushing 156. Relative oscillatory movement between the bolt 151 and the eye 154 about the axis of the bolt results in frictional movement between the lining 156b and the bolt 151.

The double conical bushing 156 and the surfaces of the eye 154 provides the desirable damping of the "whipping action" of the steering link 153 which was described in connection with Figure 2. The annular lips 164 and 165 on the ends of the rubber bushing 156 are molded in such shape that when assembled as shown they will be resiliently urged against the drag link 150 and the bolt head 151b, respectively, to serve as dirt seals.

A modified form of the pivotal connection of Figure 7 is shown in Figure 8 in which the central flange 163 of Figure 7 is omitted. This bushing 165 has a central cylindrical portion 162a which joins the smaller ends of the frusto-conical surfaces. The inner contour of the eye member 154a is complemental to the outside contour of the bushing 165. The bushing is molded with recesses or indentations 165a on the inner surface of the bushing to receive and retain excess lubricant. In other respects this modified form is similar to that of Figure 7.

Further modified forms of the invention are shown in Figures 9 to 12, inclusive, which are generally of the cylindrical type designed primarily to provide a lubricated pivotal connection on the axis of the cylinder while at the same time serving as an insulator and permitting a small degree of pivotal movement in planes at right angles to the cylinder axis and about axes at right angles to the axis of the cylinder axis.

In Figure 9 the invention is shown as applied to a support for an independently suspended wheel. The parts which are pivotally connected are a U-shaped member 170 adapted to be secured to a vehicle frame and a supporting arm (not shown) which terminates in an eye 171. A suitable pin or bolt 172 extends through aligned holes in the member 170, the bushing 173 of the present modification being arranged around the bolt. A bearing sleeve 175 and washers 176 and 177 are press fit on the bolt 172.

The bushing 173 comprises a rubber sleeve 173a and a lining 174 similar in characteristics to the lining 156b of Figure 7, previously described. The lining has integral flanges 174a and 174b which respectively engage the washers 176 and 177. The bushing 173 is molded with an annular recess 178 which serves to receive any surplus lubricant. Annular flanges 173b and 173c on the rubber bushing 173 have four bosses 179 spaced 90° with respect to each other which engage complemental recesses 181 in the eye 171. The flanges 173b and 173c will be molded in such free shape that when assembled as shown they will serve as dirt seals. It will be understood from the foregoing that any relative pivotal movement between the member 170 and the eye 171 will result in frictional movement between the lining 174 of the bushing 173 and the sleeve 175 and washers 176 and 177. Also, any slight pivotal movement about axes at right angles to this axis will be permitted by distortion of the bushing 173.

Figure 10 shows a construction, in general, similar to that of Figure 9, except that no metal sleeve and washers are provided over the inner pivotal member. The supporting member may be the two legs 185 of a channel member through which extends an inner pivotal member such as a pintle 186. This pintle has an integral flange 187 at one side and a groove 188 and locking ring 189 at the other for the purpose of axially positioning the legs 185 of the channel member. The member which is pivotally supported on the pintle 186 may be a suitable wheel supporting arm (not shown) terminating in an eye 191. A bushing 193 of the same construction as that of Figure 9 is arranged between the pintle 186 and the eye 191 and the operation is the same as that previously described.

Figure 11 shows the bushing similar to that of Figures 9 and 10 applied to a spring shackle 196. The shackle has a pintle or bolt 197 extending through aligned openings in the shackle links. An eye 198 of a leaf spring (not shown) is pivotally supported by, and resiliently insulated from the bolt 197 by a pivotal bushing 199 of the type shown in Figures 9 and 10.

Figure 12 shows the bushing of Figures 9, 10, and 11 applied as a pivotal connection and an insulator for a torque arm in a vehicle suspension. The U-shaped member 201 may be attached to the frame of a vehicle in any suitable manner and has aligned apertures in the legs to receive a bolt 202. The bolt has a stepped head 203 which fits into a large aperture 204 in one of the legs of the member 201. The aperture 204 is large enough in diameter to permit the insertion and assembly of a resilient bushing 206 of the type shown in Figures 9, 10, and 11. The bushing 206 is assembled inside of a cylindrical sleeve 207 which is welded, or otherwise secured, to an end of a torque arm 208. The bore of the sleeve 207 is in axial alignment with the aperture 209 in the torque arm. The operation of this modification is substantially identical to that of the constructions of Figures 9, 10, and 11.

In the foregoing where reference is made to rubber, it is to be understood that this is by way of example only and is not to be construed as a limitation of the invention to the use thereof.

Permanently lubricated as used in specification and claims, means that the joint is provided with sufficient lubricant so that in the absence of damage in the usual use, the joint will be lubricated for the full useful life thereof.

The description which has been given, recites more or less detail of particular embodiments of the invention, which is set forth as new and useful. However, I desire it to be understood that the invention is not limited to such exact details of construction, because it is manifest that changes and modifications may be made within the scope of the appended claims, without departing from the spirit of the invention. Also, the invention is not limited to the applications or uses described, but is to be to understood as contemplating all inherent uses or functions.

What is claimed is:

1. In an insulating and pivotal joint an outer housing member, an inner bearing member having a shank, a resilient bushing member interposed between said outer housing member and said inner bearing member, said resilient bushing member having an integral extension extending beyond said housing and around said shank, an element attached to said shank having bearing surfaces confronting the end of the extension on said bushing member, said extension having integral resilient means operatively interposed between said bearing surface and said housing and mechanically interlocked with the latter to resiliently resist relative pivotal movement between said inner bearing member and said housing member.

2. An insulating and pivotal joint comprising an outer housing member, an inner bearing member having a shank, resilient bushing member interposed between said outer housing member and said inner bearing member, said bushing comprising a resilient layer and a layer of fibrous material having one face thereof integrally bonded to said resilient layer and having its remainder impregnated with lubricant, said resilient bushing having an integral extension extending beyond said housing and around said shank, diametrically opposed recesses in said housing, and means associated with said extension and engaging said recesses to resiliently resist relative pivotal movement between said inner bearing member and said housing member.

3. An insulating and pivotal joint as set forth in claim 2 in which the means spaced on opposite sides of the shank for resiliently resisting relative pivotal movement of the inner bearing member and the outer housing member are lugs integrally attached to the bushing extension.

4. An insulating and pivotal joint comprising an inner cylindrical member, an outer cylindrical member, a resilient bushing between said inner and outer member, said bushing having integral flanges extending radially and a permanently lubricated lining on the inside thereof and on the outer faces of said flanges, said lining having one face thereof integrally bonded to said resilient bushing and having its remainder impregnated with lubricant, and axial thrust members fixedly associated with said inner cylindrical member, said flanges being mechanically interlocked with said outer cylindrical member.

5. An insulating and pivotal joint as set forth in claim 4 in which said bushing and lining has a circumferential recess confronting the inner cylindrical member for the reception of excess lubricant.

ROY W. BROWN.

CERTIFICATE OF CORRECTION.

Patent No. 2,324,984. July 20, 1943.

ROY W. BROWN.

It is hereby certified that error appears in the printed specification of the above numbered patent requiring correction as follows: Page 2, first column, line 64, for "gear" read --bearing--; and second column, line 55, for "wtihout" read --without--; page 3, first column, line 40, for "plan" read --plane--; page 4, second column, line 6, strike out "to" second occurrence; and that the said Letters Patent should be read with this correction therein that the same may conform to the record of the case in the Patent Office.

Signed and sealed this 7th day of September, A. D. 1943.

Henry Van Arsdale,
Acting Commissioner of Patents.

(Seal)